INVENTORS
Russell D. Gould
John E. Richter
BY Flehr, Hohbach, Test,
Albritton & Herbert
Attorneys

United States Patent Office 3,564,825
Patented Feb. 23, 1971

3,564,825
VARIABLE INERTIA WEIGHT FOR TREE SHAKER
Russell D. Gould, San Jose, and John E. Richter, Felton, Calif., assignors to AgMac Inc., Ripon, Calif., a corporation of Delaware
Filed Sept. 30, 1968, Ser. No. 763,667
Int. Cl. A01g *19/08*
U.S. Cl. 56—328                                    3 Claims

ABSTRACT OF THE DISCLOSURE

A variable inertia weight bob for use in tree shakers consisting of an eccentric hollow structure partially filled with lead pellets.

BACKGROUND OF THE INVENTION

This invention relates to tree shakers and more particularly to the mechanisms for imparting tree shaking motion to elements of such shakers. Reference is made to my copending application Ser. No. 519,177, filed Jan. 6, 1966, now Pat. 3,457,712, entitled tree shaking apparatus, which shows a tree shaker of the type having suspended inertial shaking mechanism utilizing a pair of eccentrically mounted solid weight bobs, chain driven in timed relation by a suitable motor. In use, such weight bobs have been satisfactory for a wide variety of applications. But, in harvesting different tree crops, the weights of the bobs have often had to be changed to match the degree of shaking force required for a particular type of tree. Such changes have required changes in the size and weight of bob and time consuming disassembly and reassembly of portions of the shaker. Additionally, with solid bobs of fixed inertia, there is an interim period when the shaker is not up to normal operating speed which is unstable and in which the operator and apparatus are subjected to an uncomfortable asynchronous shaking motion, which is not particularly effective as a harvesting motion. There is, therefore, a need for a new and improved tree shaking mechanism.

SUMMARY OF THE INVENTION AND OBJECTS

In general, it is an object of the present invention to provide a new and improved tree shaking mechanism utilizing a variable inertia weight bob which will overcome the above named limitations and disadvantages.

Another object of the invention is to provide a variable inertia weight bob in which the moment of inertia of the bob rapidly increases as a function of its rotating speed during its initial acceleration from rest and rapidly decreases during deceleration.

Another object of the invention is to provide a weight bob of the above character in which the amount of weight and result in inertia can be varied in a simple, quick operation, and in which the total weight can be varied in extremely fine increments to provide a wide range of shaking forces.

Another object of the invention is to provide a tree shaking mechanism of the above character which has an improved tree shaking motion.

Generally, the tree shaking mechanism of the present invention includes at least one eccentric weight or bob which is provided with means for rotationally mounting the same about an axis. A shell-like structure is asymmetrically mounted with respect to said means and serves to form a hollow cavity having portions thereof extending radially away from and asymmetrically about the axis of rotation of the bob. The shell-like structure contains a mass of flowable heavy matter which preferably partially fills the same. Such heavy matter can consist of suitable metal pellets such as lead shot, BB's or the like. By partially filling the cavity, the moment of inertia at rest has a relatively low value whereas, when the bob is rotated and the matter moves outwardly, the moment of inertia increases in proportion to the redistribution of mass from portions adjacent the axis of rotation to regions more remote. In start-up, this increase occurs in such a manner as to produce a particularly effective shaking motion in which the fruit is quickly removed from the tree. Fill and drain holes are provided for conveniently adding or removing the matter from the bob.

These and other objects and features of the invention will become apparent from the following description when taken in conjunction with the accompanying drawings and claims.

DETAILED DESCRIPTION OF THE INVENTION

Figure 1:
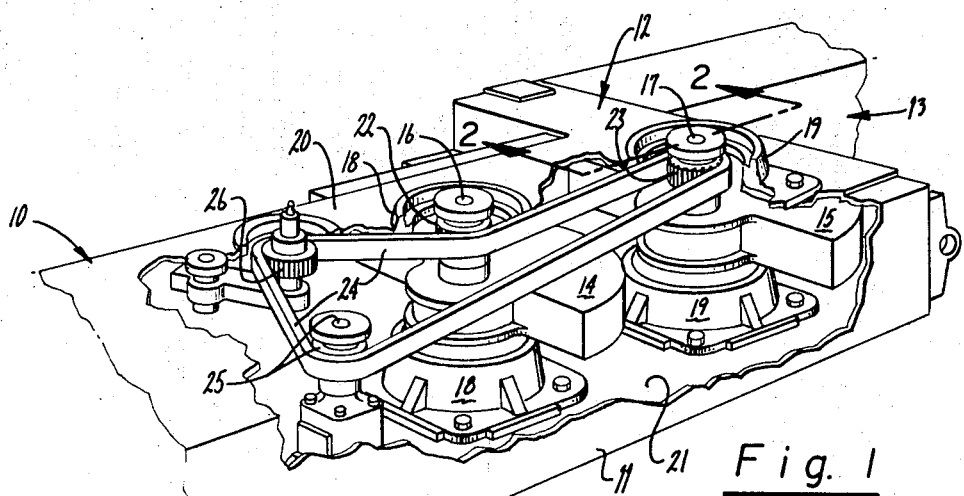
FIG. 1 is an isometric view of a shaking mechanism and weight bob installed in a shaker and constructed according to the present invention.

Referring now to the drawings, there is shown a tree shaking mechanism constructed according to the invention and consisting generally of a vehicle having a subframe (not shown) for supporting an elevational boom 10 carrying suspension units at its free end for supporting a housing 11 which carries both the shaking mechanism 12 and an associated tree hooking mechanism 13. Other details of the construction of a tree shaker of this type are not required to be explained herein in order to understand the present invention and can be obtained from reference to our copending patent application previously referred to.

As shown, shaking mechanism 12 consists generally of a system of rotating eccentric weights 14, 15 fixed to vertical shafts 16, 17 set in bearing assemblies 18, 19 mounted onto the upper and lower walls 20, 21 of the housing. Portions of shafts 16, 17 are provided with suitable gears 22, 23 which are adapted to be engaged by a drive chain 24 which also passes about a drive motor shaft and gear 25 and idler tension gear 26 in such a fashion that the chain drives one rotating weight counterclockwise and the other clockwise to produce gyratory shaking forces.

Figure 2:
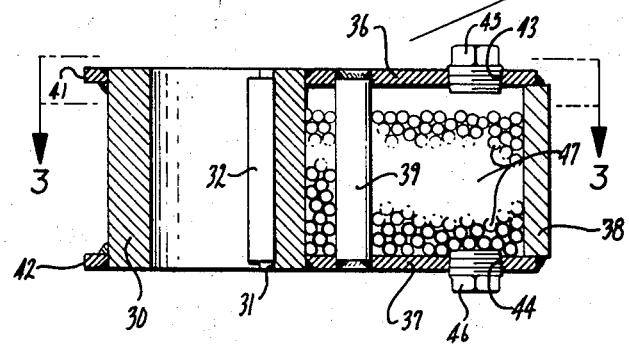
FIG. 2 is a cross sectional view in elevation taken along the lines 2—2 of FIG. 1.
Figure 3:
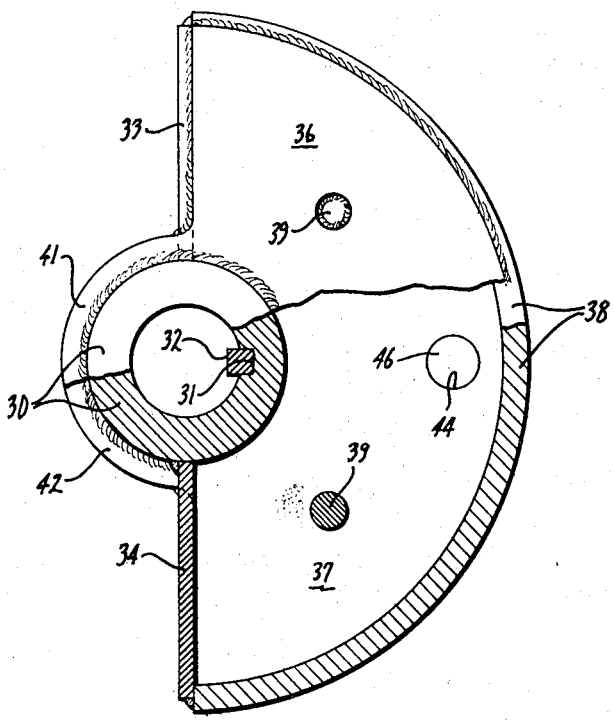
FIG. 3 is a cross sectional plan view taken along the lines 3—3 of FIG. 2.

Referring now to FIGS. 2 through 3, the construction of one of the weights in accordance with the present invention is illustrated in detail. The weight is supported on a sleeve 30 having an inwardly facing slot 31 for receiving a key 32 which engages the shaft to prevent rotation therebetween. Outwardly extending wing plates 33, 34 are welded onto each side of sleeve 30 and are connected to generally semicircular spaced top and bottom plates 36, 37 and a semicylindrical outer plate 38. The several plates are welded together to form a unitary, hollow shell-like structure having a closed semicylindrical form lying on one side of the sleeve. Suitable stiffening bars 39 are attached between the top and bottom plates for rigidity and portions of the top and bottom plates are extended to form encircling flanges 41, 42 about the sleeve for additional support against centrifugal forces when the weight is rotated. Suitable openings 43, 44 are provided for forming an inlet and an outlet which are normally closed by threaded plugs 45 and 46. As so formed, the inside of the structure of the weight comprises a cavity which is asymmetrically arranged with respect to the axis of rotation and which has smaller sections located adjacent the axis of and successively larger sections located away from the axis.

A mass 47 of flowable, heavy matter is disposed in the cavity, the amount and character of the mass determining the amount of shaking force developed by the weight. Preferably this mass consists of metallic pellets such as lead shot or BB's and the amount of mass utilized is determined by the amount of shaking force to be generated. In operation, the operator can readily determine whether the amount of shaking force is too great and likely to damage his crop or whether it is too low and inadequate to fully harvest the same. Thus, the amount of lead shot is determined for a particular orchard and would not be changed during the harvesting operations therein. If it is desired to change the amount of weight to increase or decrease shaking forces, it is easily accomplished by either draining some of the shot through the lower hole or adding shot through the upper fill hole as desired. As set forth in the above referenced copending application, significant degree of shaking force can be controlled by the operator selecting suitable speed of rotation of the weights.

An important feature of the present weight bob involves the shifting of the mass of heavy matter within the cavity due to its flowable characteristics. When at rest, the matter settles and flows into a level configuration in which the shot uniformly fills all sections of the cavity. When rotated, however, the shot flows toward the outer peripheral wall and away from the axis of rotation. In this way, the moment of inertia of the weights increases significantly as it is rotated and likewise decreases as it slows down.

We have found that particularly effective results are obtained when the cavity size and load are adjusted about one-half to three-quarters filled. In this approximate range, it is found that little unstable motion is encountered during start-up and slow down. More importantly, we have also found an enhanced tree shaking motion during start-up and the initial portion of the shaking cycle, for the initial rate of delivery of shaking energy during start-up is low due to the lower moment of inertia when the flowable mass is evenly distributed. After a few revolutions, however, the mass flows to the outer portion of the cavity causing a sharp change in inertia and a sharp increase in delivered shaking force. This increase is sufficiently sudden that the fruit does not have time to respond and move in sympathy with the applied shaking forces. As a consequence, the fruit is immediately dislodged from the tree and the time and total energy required for the shaking operation is considerably reduced. The change in inertia also tends to eliminate the period of unstable asynchronous motion of the shaker since the moment of inertia of the weights changes as they are slowed down. This contributes significantly to operator comfort since the severest shaking motion to the associated vehicle can occur during this period.

Whenever it is desired to change the value of the moment of inertia of the weights, the drain or fill plugs 45 and 46 are opened and some of the lead shot is removed or added until the desired weight contains the desired quantity of heavy material.

To those skilled in the art to which this invention relates, many changes in the construction thereof and widely differing embodiments and applications of the invention will suggest themselves without departing from the spirit and scope thereof. For example, while a pair of weights of identical construction are disclosed and while reference is made to a structure of our previously filed application, it will be understood that these structures are merely illustrative of many which could utilize the weight of the present invention. Additionally, this weight is not limited to use in pairs but may be used singly or in any other combination and may utilize other flowable heavy matter besides the metal shot, as, for example, liquid water. It should be understood, therefore, that the disclosures and descriptions contained herein are to be taken as an illustration of the invention and are not intended to limit its scope.

What is claimed is:

1. In a tree shaking mechanism, at least one eccentric weight having variable inertia in response to being brought up to speed from rest, including, an axial member, means mounting said axial member for rotation about an axis generally perpendicular to the direction in which shaking force is to be developed, wall means connected to said axial member and cooperating therewith to define a closed hollow chamber asymmetrically disposed with respect to said axial member, said wall means being defined by generally non-re-entrant peripheral shape, first plug means forming an inlet disposed in the upper portion of said wall means, second plug means forming an outlet to a lower portion of said wall means, a mass of flowable discrete heavy particles disposed in said chamber, means for rotating said weight to develop outwardly directed forces by the asymmetric distribution of said flowable matter about said axis, said flowable matter being caused by centrifugal forces on rotation to progressively shift to the outer regions of said cavity, and means for coupling the vibrations caused by said rotation to the tree to be shaken.

2. Tree shaking mechanism as in claim 1 wherein said heavy matter occupies one-half to three-fourths of said cavity and in which heavy matter is metal shot.

3. Tree shaking mechanism as in claim 1 wherein said axial member comprises a sleeve and wherein said wall means comprises a plurality of walls forming a semi-cylindrical hollow structure connected on one side of said sleeve such that the axis thereof coincides with said axis of rotation.

References Cited

UNITED STATES PATENTS

| | | | |
|---|---|---|---|
| 1,383,676 | 7/1921 | Thompson | 74—87 |
| 2,634,617 | 4/1953 | Dryg | 74—87 |
| 3,457,712 | 7/1969 | Gould et al. | 56—328 |
| 3,460,329 | 8/1969 | Overstreet, Jr. | 56—328 |

RUSSELL R. KINSEY, Primary Examiner

U.S. Cl. X.R.

74—61